United States Patent [19]

Ishizuka

[11] 4,131,103
[45] Dec. 26, 1978

[54] APPARATUS FOR SAWING STONE

[76] Inventor: Hiroshi Ishizuka, 19-2 Ebara 6-Chome, Shinagawa-Ku, Tokyo, Japan

[21] Appl. No.: 786,842

[22] Filed: Apr. 12, 1977

[30] Foreign Application Priority Data

May 17, 1976 [JP] Japan .................................. 51-56343

[51] Int. Cl.² .............................................. B28D 1/04
[52] U.S. Cl. ...................................... 125/13 R; 83/36
[58] Field of Search ........................ 125/13, 35; 51/72; 144/242 G; 83/36

[56] References Cited

U.S. PATENT DOCUMENTS

| | | | |
|---|---|---|---|
| 390,034 | 9/1888 | Peckover | 125/13 |
| 1,327,923 | 1/1920 | Phillips | 125/13 R |
| 1,424,719 | 8/1922 | Funk | 125/26 |
| 1,707,847 | 4/1929 | Edel | 125/13 R |
| 2,842,115 | 7/1958 | Pepi | 125/35 |
| 3,332,412 | 7/1967 | Clement | 125/14 |

FOREIGN PATENT DOCUMENTS 272883  6/1971  U.S.S.R. ............................... 125/13 R

*Primary Examiner*—Harold D. Whitehead
*Attorney, Agent, or Firm*—Birch, Stewart, Kolasch & Birch

[57] ABSTRACT

An apparatus for sawing a stone block to be severed into a plurality of slabs. The apparatus comprises a plurality of saw blades characterized by arranging said blades in series in the cutting plane of said blades. The cutting depth of each blade in the series is progressively deeper from the first blade to the last one so that a stone block which is successively fed to said series of saw blades may be efficiently severed.

3 Claims, 7 Drawing Figures

APPARATUS FOR SAWING STONE

BACKGROUND OF THE INVENTION

1. Field of the Invention

The present invention relates to an apparatus for sawing a stone block, and more particularly to an apparatus for severing the stone block into a plurality of slabs.

2. Prior Art

Recently there has been an increased demand for slabs of stone such as marble, granite and the like to be used for flooring, walling and the like. Conventionally the stone blocks cut at the mine or quarry are transferred to the processing factory where said stone block is severed into a plurality of slabs which may be finished by grinding.

In a conventional processing factory there is provided a work bed on which the stone block is fixedly laid, onto which a rotary cutting wheel having a peripheral portion embedded with finely divided particles of any hard material such as diamond is manually pressed downwards and forwards. When the saw blade has been advanced along the stone block length to the opposite side thereof after having cut the stone block by a predetermined depth, the saw blade is retracted to the initial position for repeating the advance-cutting work. During the repeated reciprocal travels of the rotary cutting wheel along the length of the stone block, the cutting depth is gradually deepened to complete the cutting work. Such method has been widely adopted and used for a long time despite fact that the retractive travels of the saw is obviously inefficient for the cutting work. It is sometimes possible of course to cut the stone block in a single stroke, namely without repeating said reciprocal travels of the saw, but the feeding rate of the saw must be considerably slower in view of incrementally increased resistance.

SUMMARY OF THE INVENTION

An object of the present invention is, thus, to provide an apparatus for successively and effectively sawing the stone block to be cut into a plurality of slabs.

This object and other objects as well as various advantages of the invention may be readily appreciated by studying the following detailed explanation. The objects may be attained by providing a plurality of saw blades arranged in series in the cutting plane of the saws. The cutting depth of each blade in the series is progressively deeper from the first saw to the last one. Means are provided for successively feeding a plurality of stone blocks one by one on the work table towards the saws.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE INVENTION

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
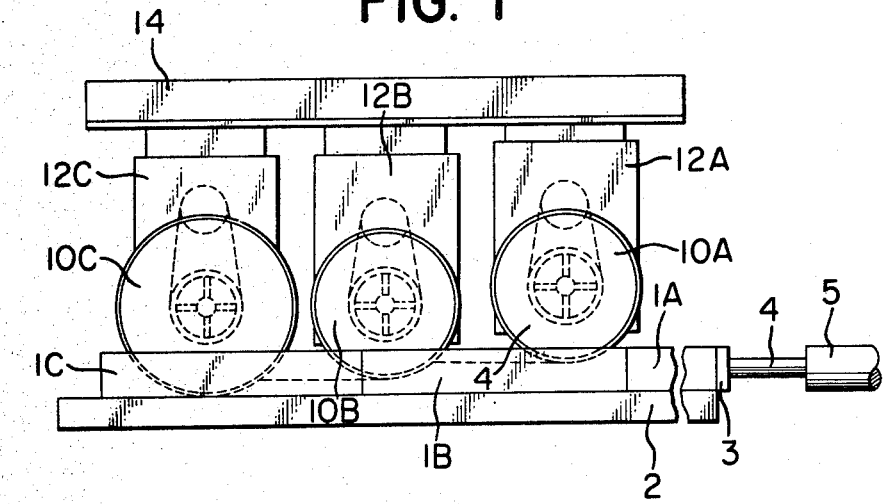
FIG. 1 is a schematic fragmentary side elevation of the first embodiment of the present invention.
Figure 2:
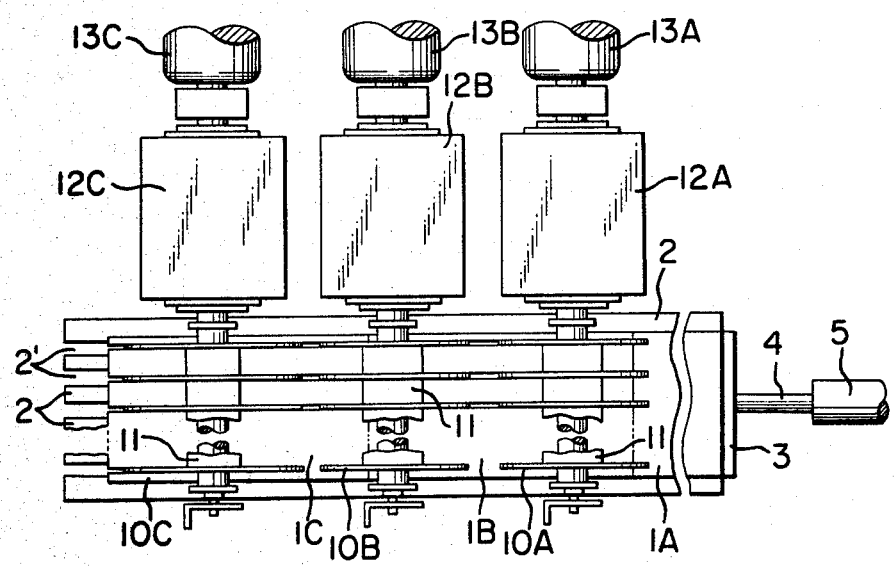
FIG. 2 is a schematic fragmentary top plan view of the above embodiment with the top casing frame removed to show the arrangement of the saws.

FIGS. 1 and 2 illustrate the first embodiment of the invention, three stone blocks 1A, 1B and 1C, each being a granite block from the Inada District and being 20 cm width, 30 cm height and 120 cm in length, are longitudinally laid on a work bed 2 and positioned one after another. The first work piece 1A fragmentarily illustrated is urged towards the left in the drawing at the trailing end thereof by means of a push member 3 fixed at the free end of a piston 4 to be cooperated with a cylinder 5 of the hydraulic pressure apparatus. In this manner the work pieces 1B and 1C are also urged and fed towards the left on said work bed 2. It is preferable for the work bed 2 to have a plurality of longitudinal slits 2' for obvious reasons which will readily be appreciated.

In the first step, there are provided twelve saw blades 10A, each of 50 cm in diameter, mounted on a shaft transversely extended from a gearing casing 12A and driven by an electric motor 13A of 75 h.p. Said saw blades 10A are each equally separated from adjacent blades by a spacer 11 of which thickness is adapted to comply with the desired thickness of the slab. The casing 12A is suspended from a machine frame 14 to be adjustable relative to the workpiece positioned on the work bed 2.

The above description also applies to the second and third saw groups 10B and 10C, except that the diameter of each saw blade of the last group 10C is 64 cm. As a matter of course, the exact dimension of these saw blades is not critical. In view of the three groups of saws provided in this embodiment, the level or positioning relative to the work piece and work bed of each saw group is so adjusted that the first 10A may cut the stone block by about 10 cm in depth or by approximately a third, the second 10B may cut the stone block by about 20 cm in depth or by approximately two thirds, and the third 10C may cut through the total thickness of 30 cm. In view of the fact that the first and second saw blades are both of 50 cm in diameter, the casing 12A is set higher than the casing 12B. By feeding the stone blocks at a rate of 5 cm/min. about 11 m$^2$ of cutting ability could be realized.

Figure 3:
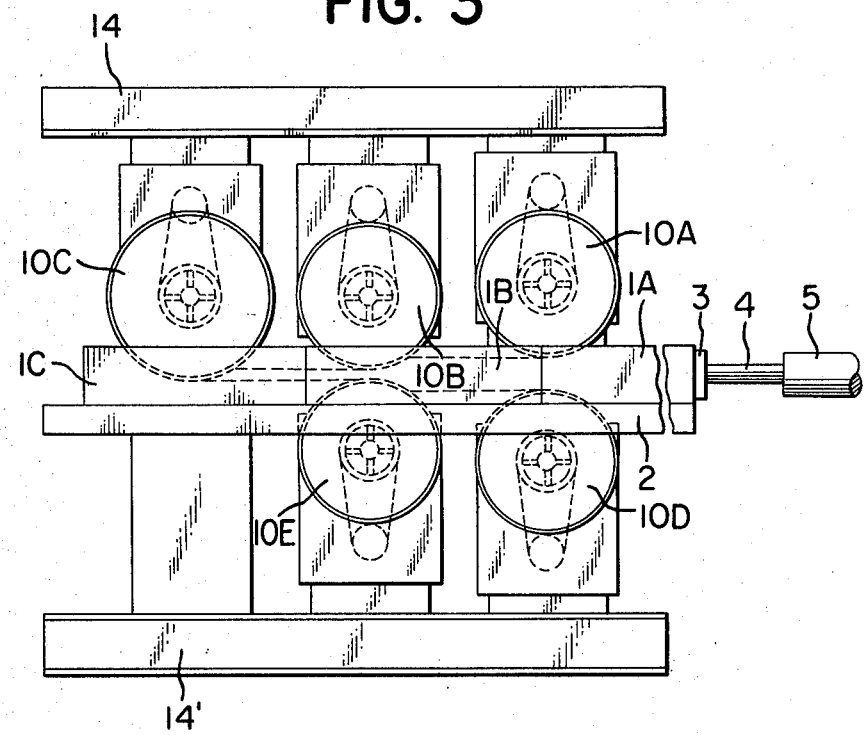
FIG. 3 is a view similar to FIG. 1 but of a modification of the above embodiment.

In reference to FIG. 3, there are provided two additional saw groups 10D and 10E each to rotatably mounted on the output shaft of the gearing casing upstanding on a lower machine frame 14' so as to be arranged under said saw groups 10A and 10B. Each saw group comprises 26 saw blades arranged transverse to the direction of the stone block feeding travel. The upper and lower first saw groups 10A, 10D as well as the upper and lower second saw groups 10B, 10E, include blades being of 50 cm in diameter, are adapted to cut the stone block by 5 cm in depth, but the last saw group 10C, including blades of 64 cm in diameter, are adapted to cut by 10 cm in depth.

When the stone block of 40 cm in width, 30 cm in height and 120 cm in length is subjected to the cutting work at a feeding rate of 10 cm/min, the cutting ability per minute was about 47 m$^2$.

Figure 4:
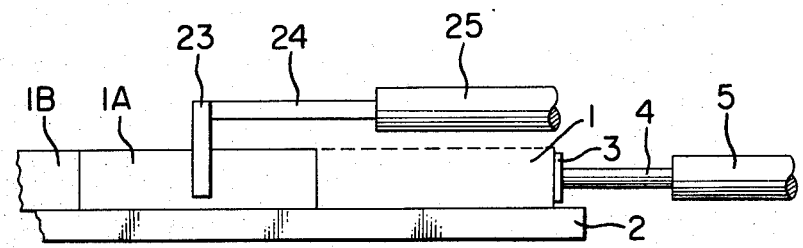
FIG. 4 is a schematic side elevation of means for successively feeding the stone blocks one by one towards the saws and of auxiliary means for feeding said stone blocks when a new stone block is being supplied and said main feeding means is in the inoperative status.

In reference to FIG. 4, there is provided an auxiliary feeder means in addition to the feeder as explained in reference to FIG. 2 in order to successively feed the stone blocks. When the main hydraulic pressure apparatus 3, 4 and 5 is retracted for preparation of receiving a new supply of the stone block 1X, said auxiliary feeder comprising a grasper 23 mounted at the free end of a piston 24 to be cooperated with a cylinder 25 as the hydraulic pressure apparatus may relievingly serve to urge the stone block 1A towards the left in the drawing.

Figure 5:
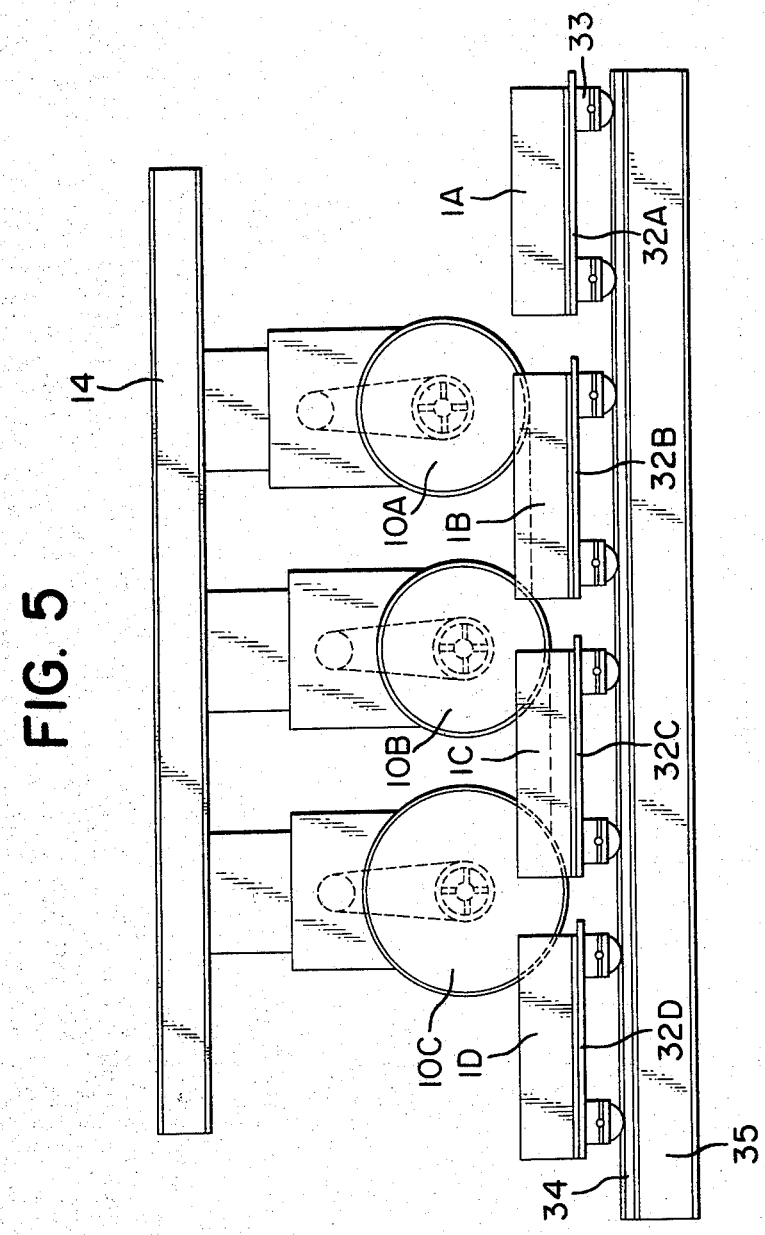
FIG. 5 is a schematic side elevation similar to FIG. 1 but with a different feeding means.

In FIG. 5 there is illustrated a different feeding means for the stone blocks 1A, 1B, 1C and 1D respectively fixedly laid on carriers 32A, 32B, 32C and 32D each having four supports 33 which may be engaged with an endless belt 34 longitudinally running on a lower machine frame 35. Said supports 33 may include a wheel to roll on a rail 34 so that each carrier 32 may be separately moved by any means not shown, or the carriers 32 connected with each other may be pulled or pushed as a whole by any means not shown.

Figure 6:
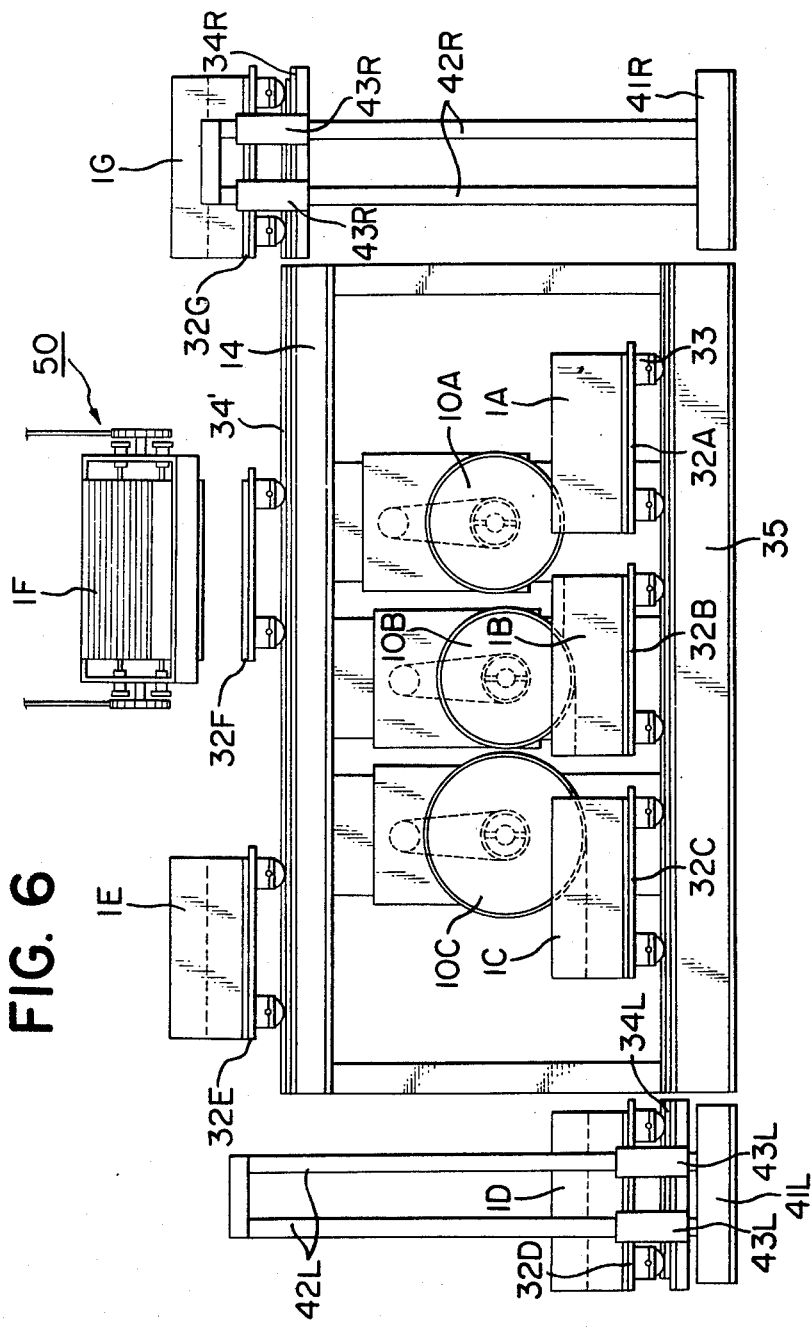
FIG. 6 is a view similar to FIG. 5 but with a further different feeding means.

In FIG. 6 the three groups of saws 10A, 10B and 10C are adapted to cut the stone block by only a half of the height or thickness thereof. The stone block 1C having been severed by a half cut in depth by the third and last saw blades 10C must be turned over to be subjected to the second cutting from the reverse side. For that purpose the half depth cut stone block 1D is taken up together with the carrier 32D by a fork lift having a fixed base 41L, vertically upstanding posts 42L, sleeves 43L guidedly movable along said posts 42L, and a pallet fixed to said sleeves 43L and having rails 34L on which the wheels 33 of the carrier 32D ride. The stone block 1E having been lifted up together with the carrier 32E is on rails 34' laid on the upper frame 14 and transferred from the rail 34L on the pallet. The stone block 1F having been transported to the middle of the elongated upper rails 34' is lifted up from the carrier 32F and turned over by a means generally represented by 50 to be explained in reference to FIG. 7 and then repositioned on the carrier 32F again. The carrier 32G on which the turned over stone block 1G is laid is taken up onto rails 34R on the pallet of the fork lift similarly having a fixed base 41R, vertical posts 42R upstanding thereon, and sleeves 43R, guidedly movable along said posts and provided fixedly with said pallet, and lowered down to be subjected to the second cutting.

Figure 7:
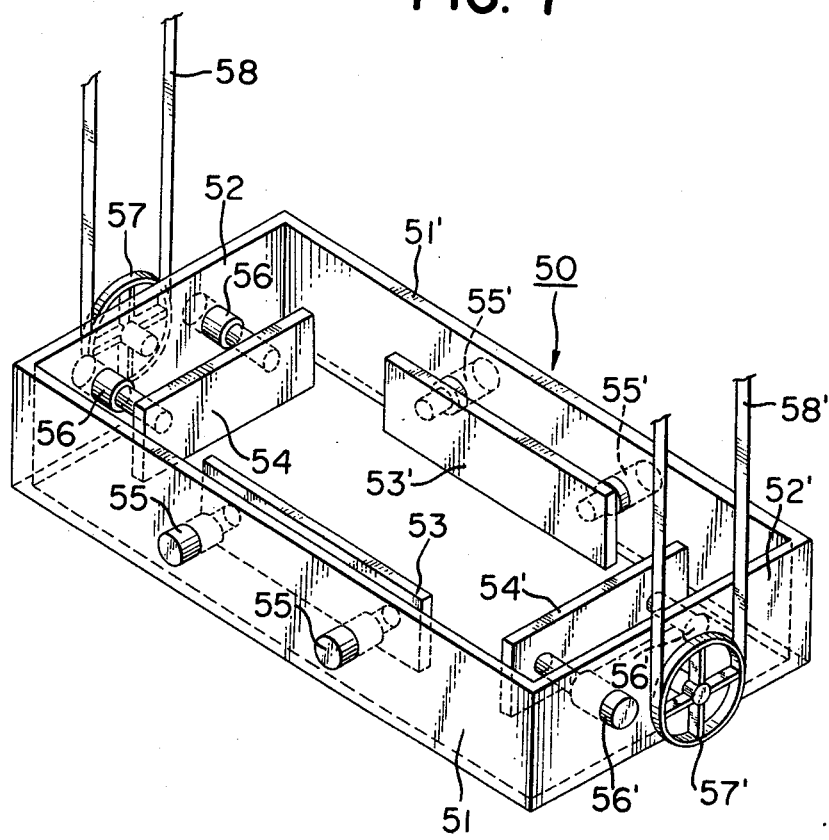
FIG. 7 is a schematic perspective view of a means for turning the stone block around to be used for the feeding means shown in FIG. 6.

In FIG. 7 the turning over means 50 comprises a frame consisting of two pairs of wall members 51, 51' and 52, 52'. Said wall members have respectively two pairs of plate members 53, 53' and 54, 54' respectively mounted to the concerned wall member by means of rods 55, 55' and 56, 56' to be, manually or hydraulically or by any other suitable means, moved toward or away from the concerned wall member. Said frame is provided with a pair of pulleys 57, 57' at the opposite wall members 52, 52' so that a pair of belts 58, 58' extending around the respective pulley may raise or lower the frame assembly as a whole or may tilt the frame to be turned over.

When said belts 58, 58' are lowered, the frame 51, 51'; 52, 52' in which said plate members 53, 53'; 54, 54' having been retracted toward the respective wall members, may snugly surround the stone block 1F on the carrier 32F. By moving the plate members 53, 53'; 54, 54' away from the concerned wall members and consequently toward the concerned sides of the stone block 1F, this can be firmly grasped in the frame. When raising the belts 58, 58' and operating them to rotate the respective pulleys 57, 57' by 180°, the frame and consequently the stone block held therein is completely turned over so as to be laid on the carrier 32F.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An apparatus for sawing stone blocks into slabs comprising:

a work bed extending in longitudinal direction of the apparatus and carrying the stone blocks adjacent to one another in a row;

a plurality of groups of rotary saw blades, each group comprising a plurality of saw blades each arranged with a spacing therebetween which corresponds to a desired thickness of the slabs to be obtained, each group of rotary saw blades being mounted on a common shaft driven by an electric motor means;

said plurality of groups of rotary saw blades being disposed in series one behind another along the work bed and adjustably arranged relative to the work bed of the apparatus;

means for feeding the stone blocks on the work bed through the groups of said saw blades, the saw blades of each group being arranged in alignment but in a different position relative to the work bed so that the saw blades of every group have common cutting planes but stepwise increasing cutting depths from the first to last group of saw blades, the improvement comprising:

a stone block feeding means including a main and an auxiliary feeder;

said main feeder includes a hydraulic piston member to push the stone block on said work bed at the rear end thereof towards the first group of saw blades; and said auxiliary feeder being cooperatively combined with said main feeder and having another hydraulic piston member with a grasper at one end;

whereby the stone blocks positioned in a row can be transferred as a whole along the cutting planes in such a way that the auxiliary feeder is actuated to graspingly transfer the stone blocks toward the first group of saw blades in lieu of said main feeder when the piston member for said main feeder is retracted for loading an additional supply of stone blocks on the work bed, until the leading end of the additional supply of stone blocks comes into contact with the trailing end of the preceding stone block by the action of the piston member for said main feeder.

2. An apparatus for sawing stone blocks into slabs comprising:

a work carrier truck which runs on a passage extending in longitudinal direction of the apparatus;

a plurality of groups of rotary saw blades, each group comprising a plurality of saw blades each arranged with a spacing therebetween which corresponds to a desired thickness of the slabs to be obtained, each group of rotary saw blades being mounted on a common shaft driven by an electric motor means;

said plurality of groups of rotary saw blades being disposed in series one behind another along the passage for the work carrier truck and adjustably arranged relative to the work carrier truck and passage of the apparatus, the saw blades of each group being arranged in alignment but in a different position relative to the work carrier truck and passage so that the saw blades of every group have common cutting planes but stepwise increasing cutting depths from the first to last group of saw blades, the improvement comprising:

a first stage for cutting the stone block a certain predetermined depth with said groups of the saw blades;

a second stage disposed above the first stage;

means arranged above said second stage to reverse the stone block having been cut by said predetermined depth;

a pair of means for vertically transferring the work carrier truck together with the stone block mounted thereon, each of said truck vertically transferring means comprising:

a base member;

a pair of upright posts mounted on the base member;

a sleeve engaged with the respective posts movably in a guided manner upwards and downwards along the posts;

a pallet secured to the sleeve so as to move therewith and having a rail means which is able to communicate with a passage of either of said first or second stage; and means for causing the vertical movement of the pallet; and said stone block reversing means comprising:

a frame member which includes two pairs of opposite wall members, one pair of which supports on an outer surface thereof a pulley member;

a belt means extending around the respective pulley member to vertically move and turn over the frame member; and a pair of push-rods disposed inside the frame member, supported by each of the wall members and having a push-plate at a free end thereof, said push-rods being actuated to move the respective push-plate away from and close to the respective wall member of the frame member for grasping the stone block therein and releasing the same therefrom;

whereby the stone blocks are cut in such a manner that the stone block cut substantially in a predetermined depth by the groups of saw blades is transferred to said second stage together with the work carrier truck by one of said truck vertically transferring means, grasped, turned over and replaced on the work carrier truck by said stone block reversing means, and returned again to an entrance of said first stage by the other truck vertically transferring means to cut a remaining predetermined depth of the stone block through the saw blade groups.

3. The apparatus as claimed in claim 1, characterized in that said plurality of groups of saw blades are disposed above and below the work bed so that the stone block fed on said work bed may be cut stepwisedly but gradually deeper from the first group saw blades toward the last group saw blades concurrently on the upper and under sides thereof.

* * * * *